(12) United States Patent
Kojo

(10) Patent No.: US 9,001,396 B2
(45) Date of Patent: Apr. 7, 2015

(54) IMAGE READING DEVICE AND IMAGE FORMING APPARATUS

(71) Applicant: KYOCERA Document Solutions Inc., Osaka (JP)

(72) Inventor: Hidehiko Kojo, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/254,585

(22) Filed: Apr. 16, 2014

(65) Prior Publication Data

US 2014/0320938 A1    Oct. 30, 2014

(30) Foreign Application Priority Data

Apr. 26, 2013   (JP) ................................. 2013-094172

(51) Int. Cl.
*H04N 1/04* (2006.01)
*H04N 1/00* (2006.01)
*H04N 1/028* (2006.01)

(52) U.S. Cl.
CPC ....... *H04N 1/00761* (2013.01); *H04N 1/02815* (2013.01)

(58) Field of Classification Search
CPC .......... H04N 2201/04703; H04N 2201/04789; H04N 2201/02425; H04N 2201/03162; H04N 2201/04717; H04N 2201/04732; H04N 2201/04787; H04N 2201/04791; H04N 2201/04793; H04N 1/047; H04N 1/1013
USPC ......... 358/474, 473, 486, 497, 496, 475, 509, 358/498
See application file for complete search history.

(56) References Cited

U.S. PATENT DOCUMENTS

| | | | | |
|---|---|---|---|---|
| 5,369,733 | A * | 11/1994 | Arimoto et al. | 358/1.2 |
| 5,970,181 | A * | 10/1999 | Ohtsu | 382/274 |
| 6,301,022 | B1 * | 10/2001 | Washio et al. | 358/488 |
| 6,411,363 | B1 * | 6/2002 | Kamada et al. | 355/52 |
| 6,633,406 | B1 * | 10/2003 | Imaizumi et al. | 358/1.18 |
| 6,760,133 | B1 * | 7/2004 | Yamada | 358/538 |
| 7,688,477 | B2 * | 3/2010 | Ikeno et al. | 358/449 |
| 7,715,066 | B2 * | 5/2010 | Michiie | 358/474 |
| 7,813,010 | B2 * | 10/2010 | Michiie et al. | 358/474 |
| 7,843,609 | B2 * | 11/2010 | Caster et al. | 358/474 |
| 7,843,610 | B2 * | 11/2010 | Hoshi | 358/474 |
| 7,916,943 | B2 * | 3/2011 | Ohara et al. | 382/168 |
| 8,014,044 | B2 * | 9/2011 | Shiga et al. | 358/488 |
| 8,340,567 | B2 * | 12/2012 | Katayama | 399/405 |
| 8,482,818 | B2 * | 7/2013 | Maruo | 358/475 |
| 8,659,802 | B2 * | 2/2014 | Ikeno et al. | 358/461 |
| 8,693,067 | B2 * | 4/2014 | Kunii et al. | 358/474 |

FOREIGN PATENT DOCUMENTS

JP        2005-49737 A      2/2005

* cited by examiner

*Primary Examiner* — Negussie Worku
(74) *Attorney, Agent, or Firm* — Stein IP, LLC

(57) ABSTRACT

An image reading device includes a contact glass having a document placing surface, an index part to be an index for aligning a corner of a document to a reference point within the document placing surface, a reading portion configured to read the document, and a light emitting portion configured to emit linear light extending in a main scanning direction. When a predetermined point apart from the index part within the document placing surface is set as the reference point, the light emitting portion moves in a sub-scanning direction so that a region of the contact glass irradiated with the linear light coincides with the predetermined point, and emits the linear light.

8 Claims, 12 Drawing Sheets

«IMAGE READING DEVICE AND IMAGE FORMING APPARATUS

CROSS-REFERENCE TO RELATED APPLICATIONS

This application is based upon and claims the benefit of priority from the corresponding Japanese Patent Application No. 2013-094172, filed Apr. 26, 2013, in the Japanese Patent Office. All disclosures of the document(s) named above are incorporated herein by reference.

BACKGROUND OF THE INVENTION

The present disclosure relates to an image reading device and an image forming apparatus.

Conventionally, there is known an image reading device configured to read a document so as to generate image data. This image reading device is mounted, for example, on an image forming apparatus configured to print an image on a paper sheet. In addition, the image reading device includes a contact glass having a document placing surface on which a document is placed, a lamp for emitting light for irradiating the document, an image sensor configured to receive light reflected by the document so as to read the document, and the like.

Along a pair of sides extending in a main scanning direction and in a sub-scanning direction of the document placing surface, there are disposed document scales for regulating a position at which the document is placed within the document placing surface. The document scales are indexes for aligning a corner of the document to a predetermined reference point to which the corner of the document should be aligned within the document placing surface. For instance, an intersection between the document scale extending in the main scanning direction and the document scale extending in the sub-scanning direction is the reference point. In this case, the document is set to abut the document scales, and hence a corner of the document can be easily aligned to the reference point.

There is an image reading device having a special mode in which a predetermined point apart from the document scales within the document placing surface is set as the reference point (to which a corner of the document should be aligned) for reading the document. In the image reading device having this special mode, in order that the user recognizes the reference point (predetermined point) for the special mode, marks indicating positions in the main scanning direction and in the sub-scanning direction of the reference point for the special mode are provided to the document scales, for example. However, for the user who wants to read a document in the special mode, even if the marks indicating the position of the reference point (predetermined point) for the special mode are provided to the document scales, it is difficult to align a corner of the document to the reference point (predetermined point) for the special mode, because the reference point (predetermined point) for the special mode is apart from the document scales.

SUMMARY OF THE INVENTION

It is an object of the present disclosure to provide an image reading device and an image forming apparatus, which can facilitate alignment between a reference point (predetermined point) and a document even in a case where the reference point to which a corner of the document should be aligned is a predetermined point apart from an index part (document scale) within a document placing surface.

An image reading device according to one aspect of the present disclosure includes a contact glass, an index part, a reading portion, and a light emitting portion. The contact glass has a document placing surface on which a document is placed. The index part is disposed along sides extending in a main scanning direction and in a sub-scanning direction of the document placing surface, so as to be an index for aligning a corner of the document to a predetermined reference point to which the corner of the document should be aligned within the document placing surface. The reading portion is disposed on an opposite side to the document placing surface so as to read a surface of the document placed on the document placing surface to face the document placing surface. The light emitting portion is held on the opposite side to the document placing surface in a movable manner in a sub-scanning direction so as to emit linear light extending in the main scanning direction toward the contact glass. Further, when a predetermined point apart from the index part within the document placing surface is set as a reference point, prior to reading the document, the light emitting portion moves in the sub-scanning direction so that a region of the contact glass irradiated with the linear light emitted from the light emitting portion coincides with the predetermined point, and emits the linear light toward the contact glass.

An image forming apparatus according to another aspect of the present disclosure includes the image reading device described above.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

An image forming apparatus including an image reading device according to an embodiment of the present disclosure is described using an example of an image forming apparatus that can execute a copy job.

(A General Structure of Image Forming Apparatus)

Figure 1:
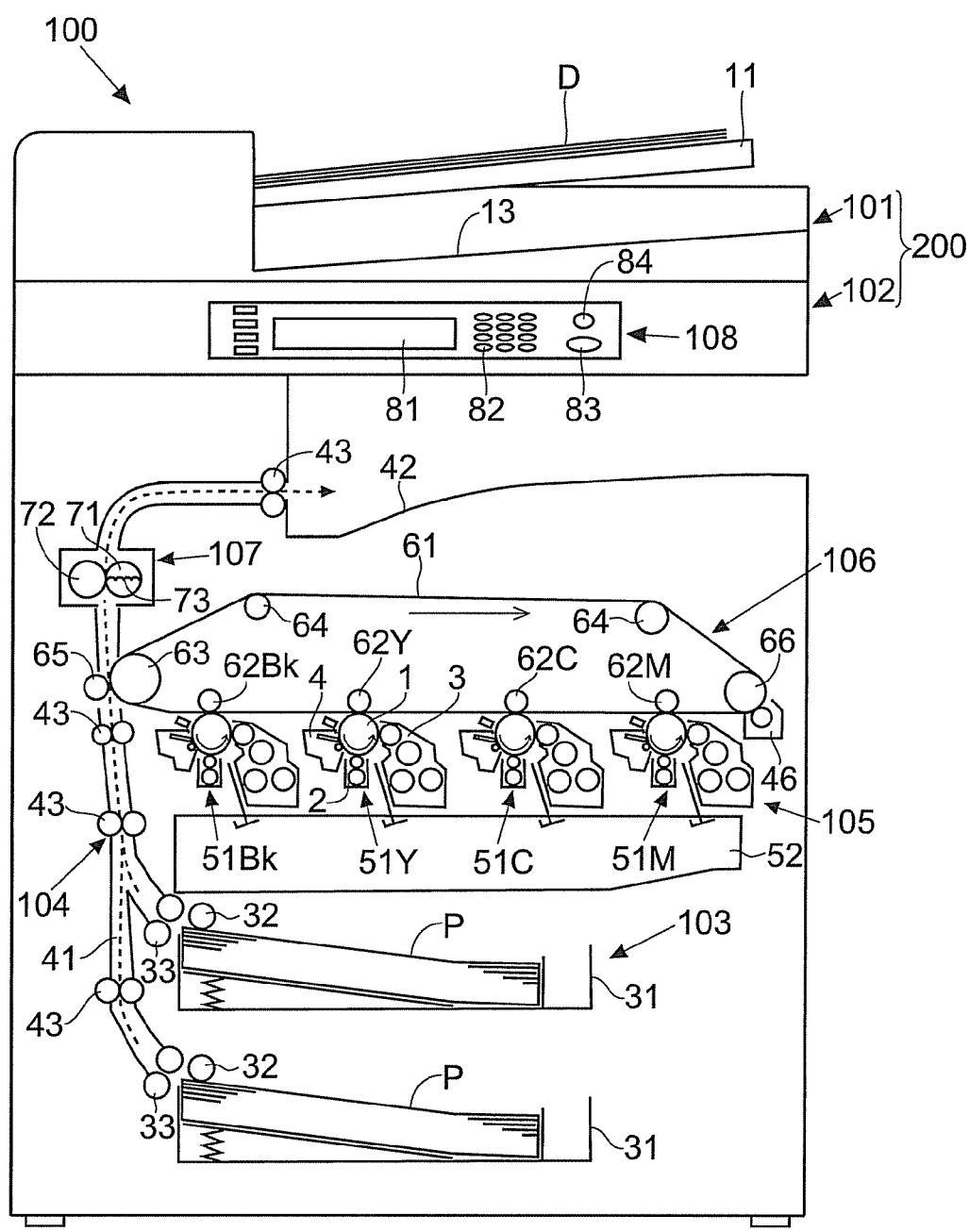
FIG. 1 is a general structural diagram of an image forming apparatus according to an embodiment of the present disclosure.

As illustrated in FIG. 1, an image forming apparatus 100 of this embodiment includes an image reading device 200 disposed in the upper part of a main body. This image reading device 200 includes a document feeder 101 and an image reading portion 102. Note that a structure of the image reading device 200 is described later in detail.

In addition, the image forming apparatus 100 includes a paper sheet feeder 103, a paper sheet transport portion 104, an image forming portion 105, an intermediate transfer portion 106, and a fixing portion 107.

The paper sheet feeder 103 includes a cassette 31 storing paper sheets P, and supplies the paper sheets P in the cassette 31 to a paper sheet transport path 41. The paper sheet feeder 103 includes a pickup roller 32 for pulling out the paper sheets P in the cassette 31 one by one sheet. In addition, the paper sheet feeder 103 includes a paper feed roller pair 33 for supplying the paper sheets P to the paper sheet transport path 41 while preventing double feed of the paper sheets P pulled out from the cassette 31. The paper sheet transport portion 104 transports the paper sheet P fed from the paper sheet feeder 103 along the paper sheet transport path 41 and guides the printed paper sheet P to a paper discharge tray 42. The paper sheet transport portion 104 includes a transport roller pair 43 for transporting the paper sheet P along the paper sheet transport path 41.

The image forming portion 105 includes a toner image forming portion 51Bk for forming a black toner image, a toner image forming portion 51Y for forming a yellow toner image, a toner image forming portion 51C for forming a cyan toner image, and a toner image forming portion 51M for forming a magenta toner image (hereinafter may be generically referred to as a toner image forming portion 51 simply). The toner image forming portion 51 includes a photoreceptor drum 1, a charging device 2, a developing device 3, and a drum cleaning device 4. In addition, the image forming portion 105 includes an exposing portion 52 for forming an electrostatic latent image on a surface of the photoreceptor drum 1.

The intermediate transfer portion 106 includes an endless intermediate transfer belt 61, and primary transfer rollers 62Bk, 62Y, 63C and 64M (hereinafter may be generically referred to as a primary transfer roller 62 simply) corresponding to black, yellow, cyan and magenta colors.

In addition, the intermediate transfer portion 106 includes a drive roller 63 and a follower roller 64. The intermediate transfer belt 61 is stretched around the drive roller 63, the follower roller 64, and the primary transfer roller 62. Further, the intermediate transfer portion 106 includes a secondary transfer roller 65 for sandwiching the intermediate transfer belt 61 with the drive roller 63.

The color toner images formed by the image forming portion 105 (toner images on the surfaces of the photoreceptor drums 1) are primarily transferred onto the intermediate transfer belt 61 in order without misregistration when a transfer voltage is applied to the primary transfer roller 62. After that, the toner images primarily transferred onto the intermediate transfer belt 61 are secondarily transferred onto the paper sheet P when a transfer voltage is applied to the secondary transfer roller 65. After the secondary transfer, a belt cleaning device 66 cleans the intermediate transfer belt 61.

The fixing portion 107 heats and presses the toner images transferred onto the paper sheet P so as to fix the toner images. This fixing portion 107 includes a heating roller 71 and a pressing roller 72. The heating roller 71 includes a heater 73. The pressing roller 72 is pressed to the heating roller 51. Then, the paper sheet P with the transferred toner image passes through a fixing nip formed between the heating roller 71 and the pressing roller 72 so as to be heated and pressed. Thus, the toner image is fixed to the paper sheet P, and printing is finished. After that, the printed paper sheet P is discharged onto the paper discharge tray 42.

In addition, the image forming apparatus 100 includes an operation panel 108. This operation panel 108 includes a liquid crystal display portion 81 with a touch panel. Further, the operation panel 108 displays a message indicating a state of the image forming apparatus 100 and displays software keys for accepting inputs such as print setting values. In addition, the operation panel 108 includes a ten-key 82 for accepting a numeral input and a start key 83 for accepting a start instruction of job execution. Further, the operation panel 108 includes an ID copy key 84 for accepting a mode change instruction to an ID copy mode. Note that the ID copy mode is described later in detail.

(Structure of Image Reading Device)

Figure 2:
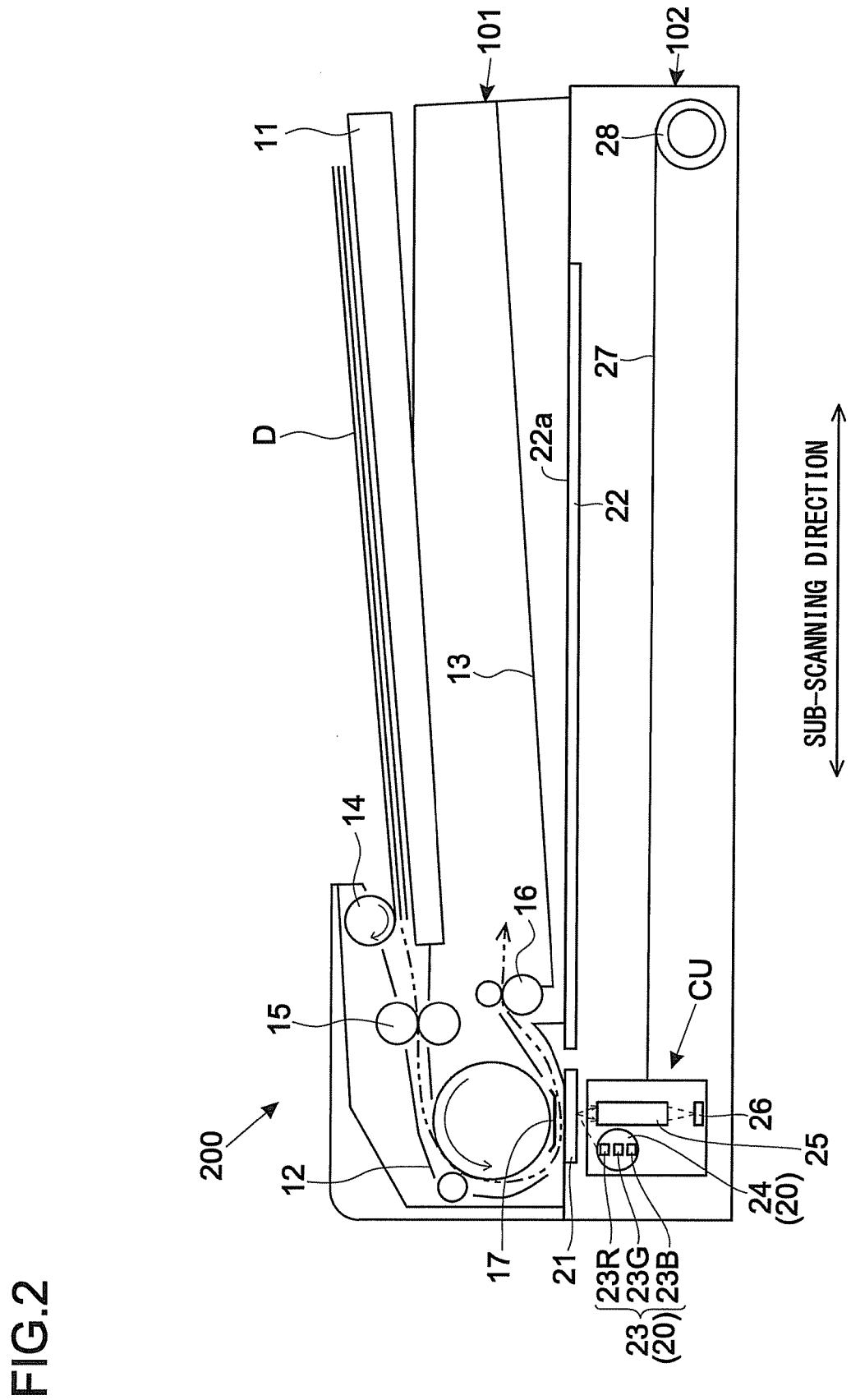
FIG. 2 is a general structural diagram of an image reading device according to the embodiment of the present disclosure.

As illustrated in FIG. 2, the document feeder 101 draws out the document D set on a document set tray 11, and discharges the document D to a document discharge tray 13 through a document transport path 12. The document transport path 12 includes a document feed roller 14, a document transport roller pair 15 and a document discharge roller pair 16 disposed in this order from the upper stream side in a document transport direction. Further, the document D set on the document set tray 11 is drawn out by the document feed roller 14 and is transported by the document transport roller pair 15 (to a feed reading contact glass 22 described later). After that, the document D is discharged to the document discharge tray 13 by the document discharge roller pair 16. In addition, a white reference plate 17 for acquiring white reference data used for shading correction is disposed in a way of the document transport path 12 (on the feed reading contact glass 22 described later).

The image reading portion 102 includes a feed reading contact glass 21 and the place reading contact glass 22 fit in a upper part of a frame of the image reading portion 102. The feed reading contact glass 21 is disposed on one end of the upper part of the frame. The place reading contact glass 22 is disposed in a middle of the upper part of the frame. The place reading contact glass 22 corresponds to a "contact glass" of the present disclosure, and a surface of the place reading contact glass 22 facing upward is a document placing surface 22a.

Figure 3:
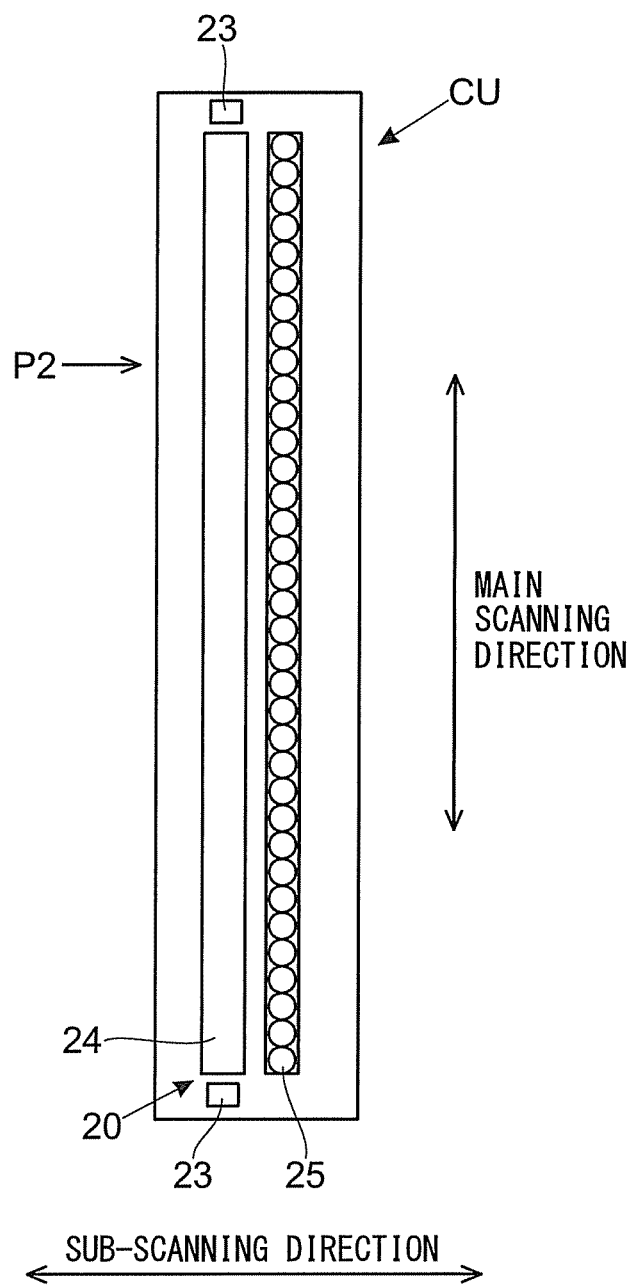
FIG. 3 is a structural diagram of a CIS unit (light emitting portion) mounted in an image reading portion of the image reading device illustrated in FIG. 2.

A CIS unit CU is disposed inside the frame of the image reading portion 102 (on the opposite side to the document placing surface 22a). As illustrated in FIG. 2 and FIG. 3, the CIS unit CU includes an LED lamp 23, a light guide 24, an image forming lens 25, and an image sensor 26, and is supported in a movable manner in the sub-scanning direction. Note that a structure including the LED lamp 23 and the light guide 24 corresponds to a "light emitting portion" of the present disclosure and may be referred to as a light emitting portion 20 in the following description.

The LED lamp 23 includes a red color LED 23R emitting red color (R) light, a green color LED 23G emitting green color (G) light, and a blue color LED 23B emitting blue color (B) light. Note that the LED lamp 23 corresponds to a "light source" of the present disclosure.

The light guide 24 is formed in an elongated shape extending in a main scanning direction (perpendicular to the paper plane of FIG. 2). Further, the LED lamp 23 is disposed on each of one end side and the other end side of the light guide 24 in the main scanning direction.

In this way, light of the LED lamp 23 is introduced to enter the light guide 24 from one end and the other end of the light guide 24. Then, the light guide 24 converts the introduced light into linear light extending in the main scanning direction and emits the linear light. The linear light emitted from the light guide 24 propagates toward the feed reading contact glass 21 or the place reading contact glass 22. Therefore, when the document D is transported onto the feed reading contact glass 21, the light after passing through the feed reading contact glass 21 irradiates the document D. When the document D is placed on the place reading contact glass 22, the light after passing through the place reading contact glass 22 irradiates the document D.

The image forming lens 25 is a rod lens array including a plurality of rod lenses arranged in the main scanning direction. Further, the light emitting portion 20 (a set of the LED lamp 23 and the light guide 24) is disposed on one side of the image forming lens 25 in the sub-scanning direction (perpendicular to the main scanning direction). Note that one set of the light emitting portion 20 may be disposed on each side of the image forming lens 25 in the sub-scanning direction.

The image sensor 26 is disposed below the image forming lens 25. In addition, the image sensor 26 includes R, G, and B color line sensors. This line sensor includes a plurality of photoelectric conversion elements arranged linearly in the main scanning direction. Further, the image sensor 26 receives reflection light reflected by the document D through the image forming lens 25. When receiving the reflection light from the document D, the image sensor 26 performs photoelectric conversion of each pixel by line unit so as to accumulate charge, and outputs an analog signal corresponding to the accumulated charge. In other words, the analog signal of each pixel of the image sensor 26 varies in accordance with reflection light amount. Note that the image sensor 26 corresponds to a "reading portion" of the present disclosure.

In addition, the CIS unit CU is connected to one end of a wire 27. The other end of the wire 27 is connected to a winding drum 28 that rotates to wind the wire 27. In this way, when the winding drum 28 rotates, the CIS unit CU moves in the sub-scanning direction. Note that a plurality of the wires 27 are connected to the CIS unit CU, and the plurality of wire 27 are stretched inside the frame of the image reading portion 102. However, only one wire 27 is illustrated in FIG. 2 for convenience sake.

Further, when reading the document D transported onto the feed reading contact glass 21, the CIS unit CU moves and rests below the feed reading contact glass 21. After that, the document feeder 101 transports the document D onto the feed reading contact glass 21. In this case, the light emitting portion 20 emits the linear light to irradiate the document D passing on the feed reading contact glass 21, and the image sensor 26 continuously and repeatedly performs photoelectric conversion of the reflection light reflected by the document D.

On the other hand, when reading the document D placed on the place reading contact glass 22, the CIS unit CU moves in the sub-scanning direction (toward the right viewed from the front). Then, while the CIS unit CU is moving in the sub-scanning direction, the light emitting portion 20 emits the linear light to irradiate the document D placed on the place reading contact glass 22, and the image sensor 26 continuously and repeatedly performs photoelectric conversion of the reflection light reflected by the document D. In other words, the image sensor 26 reads a surface of the document D placed on the contact glass 22 to face the document placing surface 22a.

Figure 4:
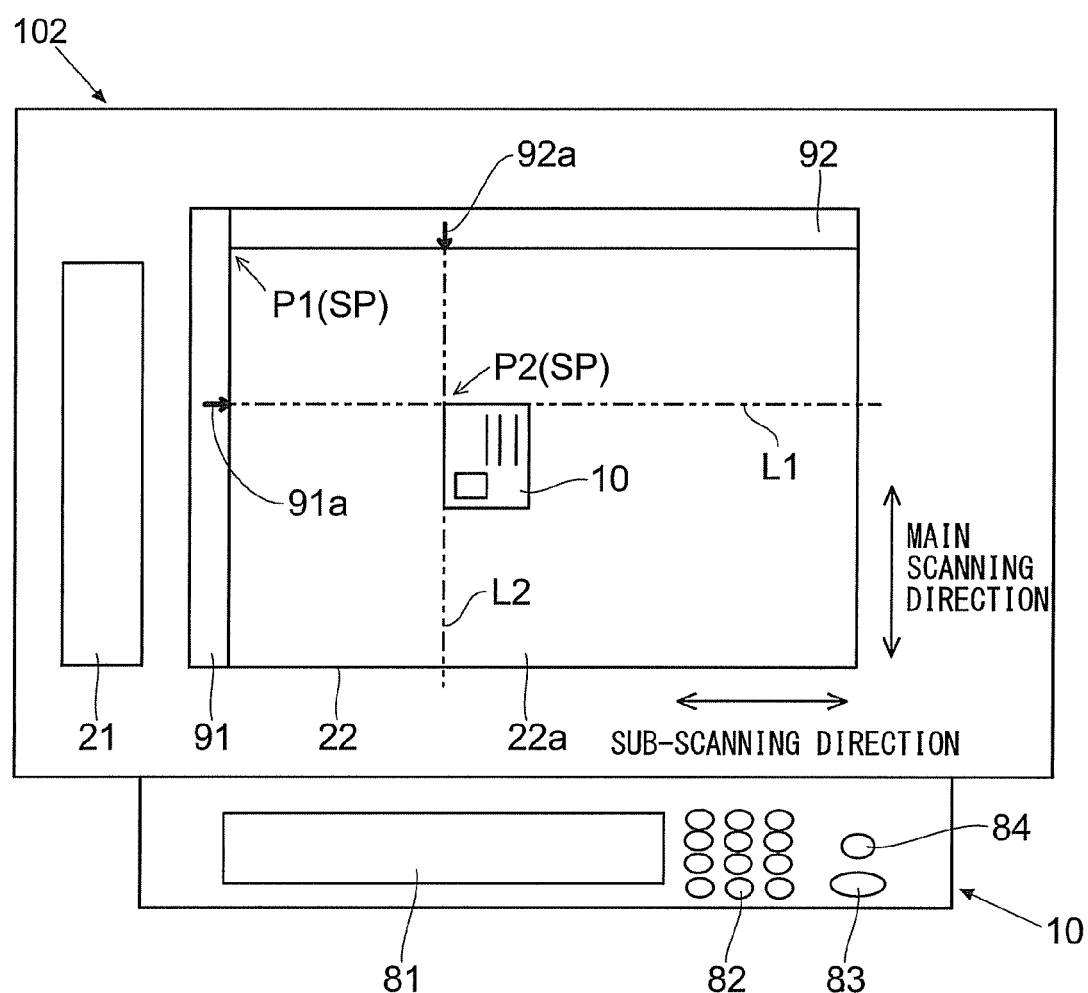
FIG. 4 is a diagram of the image reading portion of the image reading device illustrated in FIG. 2 viewed from a document placing surface side of a contact glass (diagram for explaining a position of a reference point within the document placing surface).

In addition, as illustrated in FIG. 4, a document scale 91 for regulating a position at which the document D is placed within the document placing surface 22a is disposed on one side extending in the main scanning direction of the document placing surface 22a (left side viewed from above). In addition, a document scale 92 for regulating a position at which the document D is placed within the document placing surface 22a is also disposed on one side extending in the sub-scanning direction of the document placing surface 22a (upper side viewed from above). These document scales 91 and 92 become an index for aligning a corner of the document D (upper left corner viewed from above) to a predetermined reference point SP to which the corner of the document D should be aligned within the document placing surface 22a. In other words, the document scales 91 and 92 correspond to an "index part" of the present disclosure.

For instance, in the normal copy job, a predetermined point P1 as an intersection between the document scales 91 and 92 is set as the reference point SP. Therefore, when the normal copy job is executed, a user can easily align the corner of the document D to the predetermined point P1 (reference point SP) by placing the document D on the document placing surface 22a and then setting the document D to abut the document scales 91 and 92.

Here, for the copy job in the ID copy mode, the reference point SP is set as a predetermined point P2 apart from the document scales 91 and 92 in the document placing surface 22a. Therefore, a mark 91a indicating a position in the main scanning direction of the reference point SP (predetermined point P2) for the ID copy mode is formed on the document scale 91. In addition, a mark 92a indicating a position in the sub-scanning direction of the reference point SP (predetermined point P2) for the ID copy mode is formed on the document scale 92. In other words, the position of the reference point SP (predetermined point P2) for the ID copy mode is an intersection between an imaginary line L1 extending from the mark 91a in the sub-scanning direction and an imaginary line L2 extending from the mark 92a in the main scanning direction. Further, when executing the copy job in the ID copy mode, the user places the document D on the document placing surface 22a and then aligns the corner of the document D to the position of the reference point SP (predetermined point P2) for the ID copy mode while checking the marks 91a and 92a. Note that the ID copy mode is described later in detail.

(Hardware Structure of Image Forming Apparatus)

Figure 5:
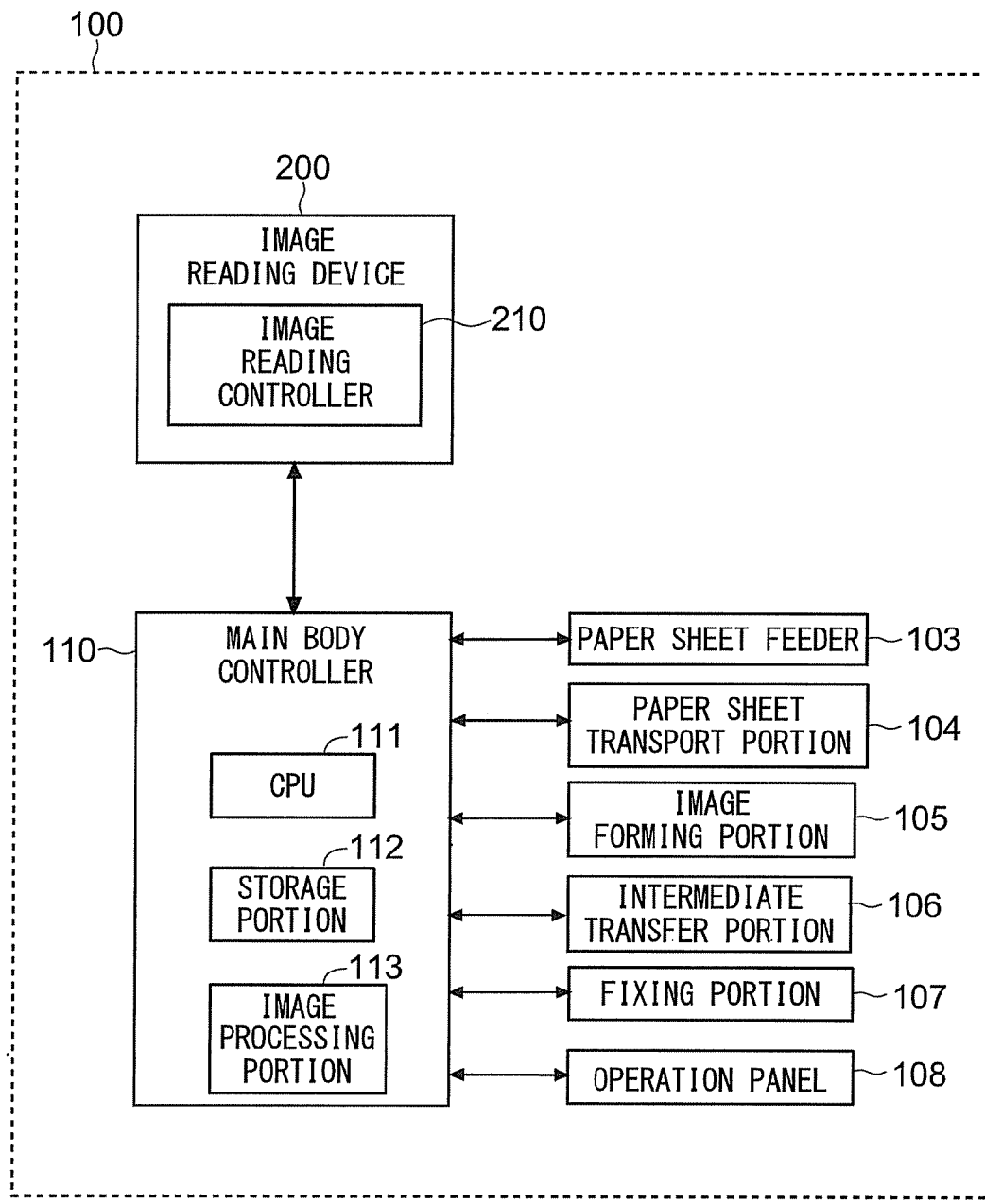
FIG. 5 is a block diagram for explaining a hardware structure of the image forming apparatus illustrated in FIG. 1.

As illustrated in FIG. 5, the image forming apparatus 100 includes a main body controller 110. The main body controller 110 includes a CPU 111, a storage portion 112, and an image processing portion 113. The storage portion 112 includes a ROM and a RAM, and for example, various programs and data are stored in the ROM and loaded into the RAM. In addition, the image processing portion 113 includes a dedicated ASIC for image processing and a memory, and performs various types of image processing such as enlargement/reduction, flip vertical, density conversion, and data format conversion on the image data.

In addition, the main body controller 110 is connected to the paper sheet feeder 103, the paper sheet transport portion 104, the image forming portion 105, the intermediate transfer portion 106, the fixing portion 107, and the operation panel 108. Further, the main body controller 110 performs calculation and control of individual portions based on various programs and data stored in the storage portion 112. In addition, the main body controller 110 is connected to the image reading device 200.

(Hardware Structure of Image Reading Device)

Figure 6:
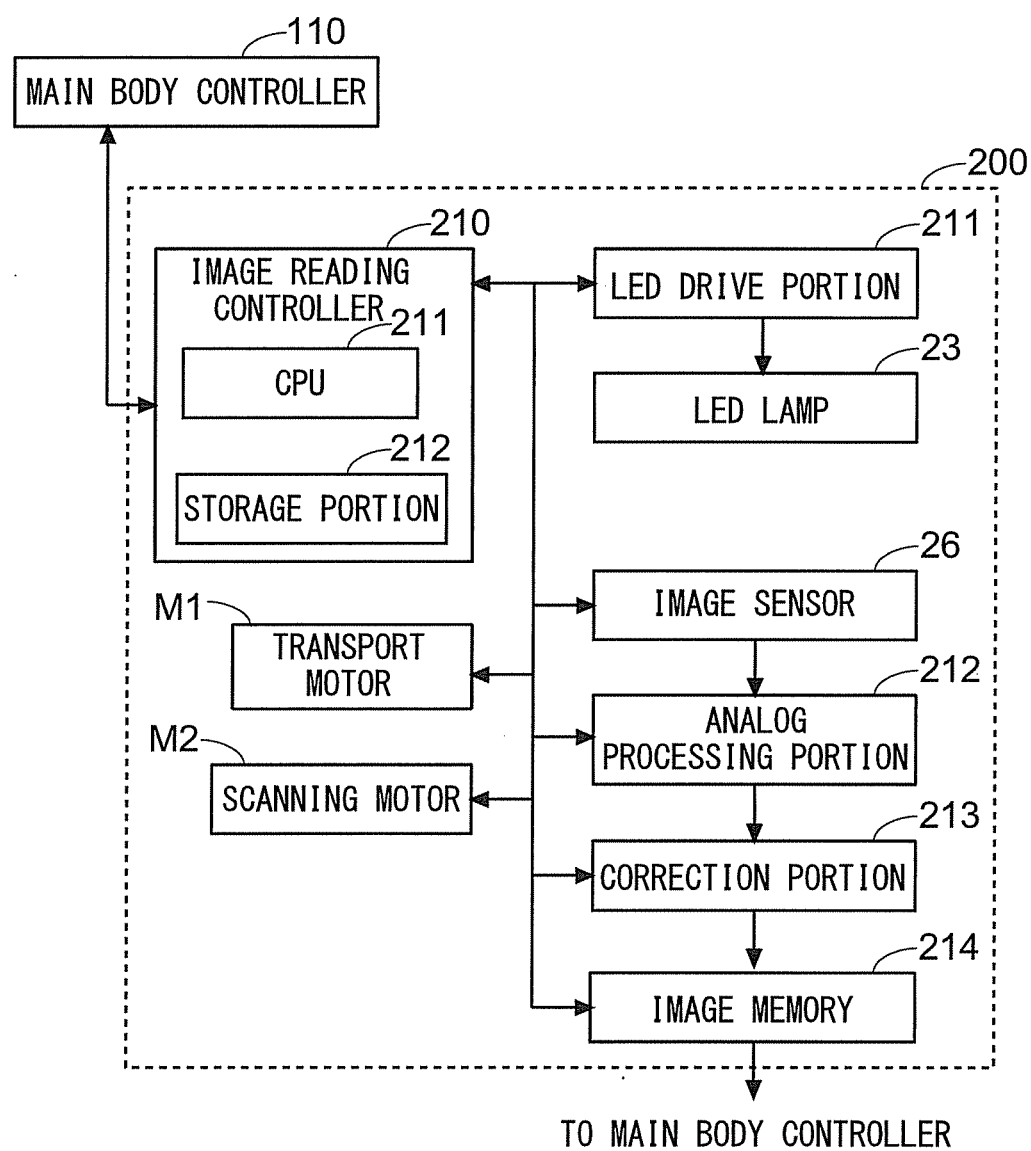
FIG. 6 is a block diagram for explaining a hardware structure of the image reading device illustrated in FIG. 2.

As illustrated in FIG. 6, the image reading device 200 includes an image reading controller 210 for controlling transport operation of the document D and reading operation of the document D. The image reading controller 210 includes a CPU 211 and a storage portion 212, and receives an instruction from the main body controller 110 to control individual portions of the image reading device 200.

Specifically, the image reading controller 210 is connected to a transport motor M1 for rotating the document feed roller 14, the document transport roller pair 15, and the document discharge roller pair 16. Further, the image reading controller 210 controls drive of the transport motor M1 so as to appropriately rotate the document feed roller 14, the document transport roller pair 15, and the document discharge roller pair 16. In addition, the image reading controller 210 is connected to a scanning motor M2 for rotating the winding drum 28. Further, the image reading controller 210 controls drive of the scanning motor M2 to appropriately rotate the winding drum 28 (to appropriately move the CIS unit CU in the sub-scanning direction).

In addition, the image reading controller 210 is connected to the LED lamp 23 (LED drive portion 211), the image sensor 26, the analog processing portion 212, a correction portion 213, and an image memory 214 so as to control operations of these portions.

The LED drive portion 211 supplies current to the LED lamp 23 so as to turn on the LED lamp 23. The analog processing portion 212 includes an amplifying circuit, an ND conversion circuit, and the like. Further, the analog processing portion 212 amplifies an analog output of the image sensor 26, converts the amplified signal into a digital image data, and outputs the digital image data. The correction portion 213 performs various corrections such as shading correction. The image memory 214 accumulates the image data and transmits the image data to the main body controller 110.

(ID Copy Mode)

The ID copy mode is a special mode for reading both sides of an ID card 10 such as a driving license card or a health insurance card (see FIG. 4), combining image data of both sides of the ID card 10, and printing the combined image data on the same side of the paper sheet P. Note that the ID card 10 corresponds to a "document" of the present disclosure in the ID copy mode.

The user who executes the copy job in the ID copy mode first presses the ID copy key 84 (see FIG. 1) so as to proceed to the ID copy mode (proceeds to a state where the copy job in the ID copy mode can be executed). Further, as illustrated in FIG. 4, after aligning a corner of the ID card 10 to the position of the reference point SP (predetermined point P2) for the ID copy mode within the document placing surface 22a, the user presses the start key 83 (see FIG. 1). In this way, one side of the ID card 10 is read.

Next, the user turns the ID card 10 upside down. Further, after aligning a corner of the ID card 10 to the position of the reference point SP (predetermined point P2) for the ID copy mode within the document placing surface 22a, the user presses the start key 83 again. In this way, the other side of the ID card 10 is read. When reading of the both sides of the ID card 10 is finished, the images of the both sides of the ID card 10 are printed on the same side of the paper sheet P.

Here, when the copy job is executed in a state where the corner of the ID card 10 is aligned to the predetermined point P1 within the document placing surface 22a (in a state where the ID card 10 abuts to the document scales 91 and 92), an outer frame of the ID card 10 may not be printed as the image. However, there is a case where it is requested to submit the paper sheet P on which the outer frame of the ID card 10 is also printed as the image. Therefore, in the copy job in the ID copy mode, the predetermined point P2 apart from the document scales 91 and 92 within the document placing surface 22a is set as the reference point SP. However, when the predetermined point P2 apart from the document scales 91 and 92 within the document placing surface 22a is set as the reference point SP for the ID copy mode, it is hard for a user who wants to execute the copy job in the ID copy mode to align the corner of the ID card 10 to the reference point SP (predetermined point P2) for the ID copy mode.

Therefore, in this embodiment, in the case where the predetermined point P2 apart from the document scales 91 and 92 within the document placing surface 22a is set as the reference point SP (in the case where the copy job is executed in the ID copy mode), prior to reading of the ID card 10, the position of the reference point SP (predetermined point P2) for the ID copy mode is indicated by light emitted from the CIS unit CU for the user.

Figure 7:
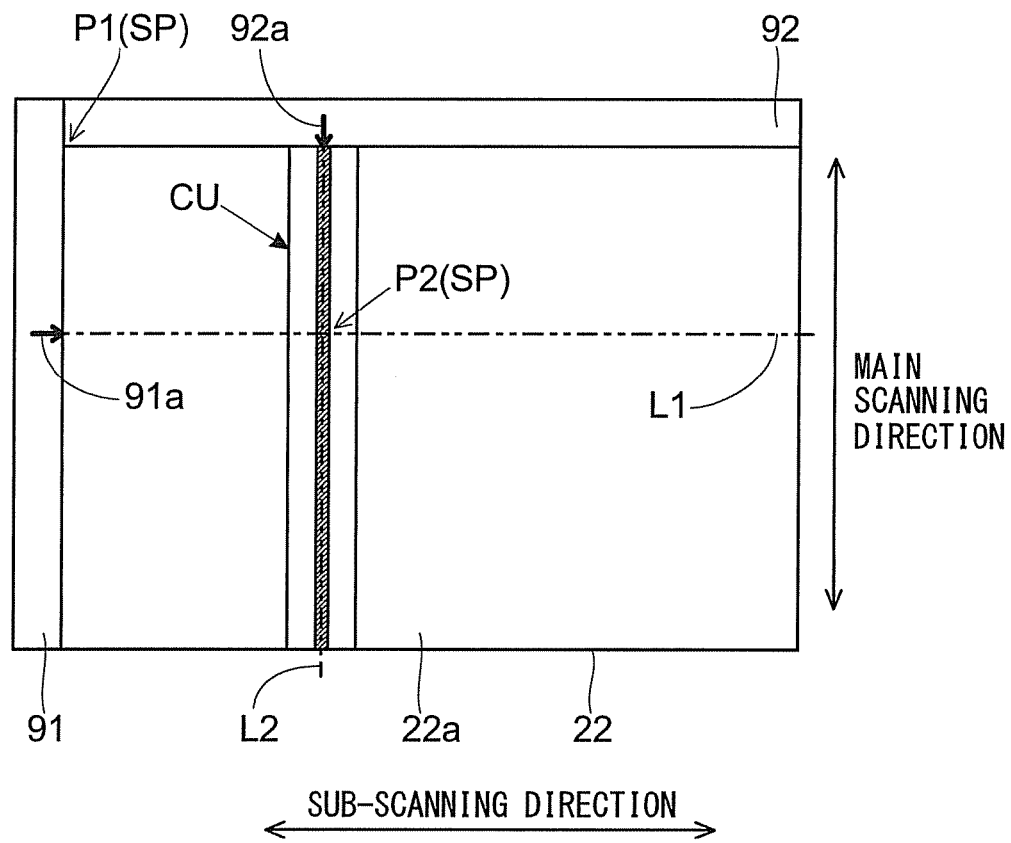
FIG. 7 is a diagram for explaining a region irradiated with linear light when indicating a position of the reference point within the document placing surface by using the CIS unit (light emitting portion) illustrated in FIG. 3.
Figure 8:
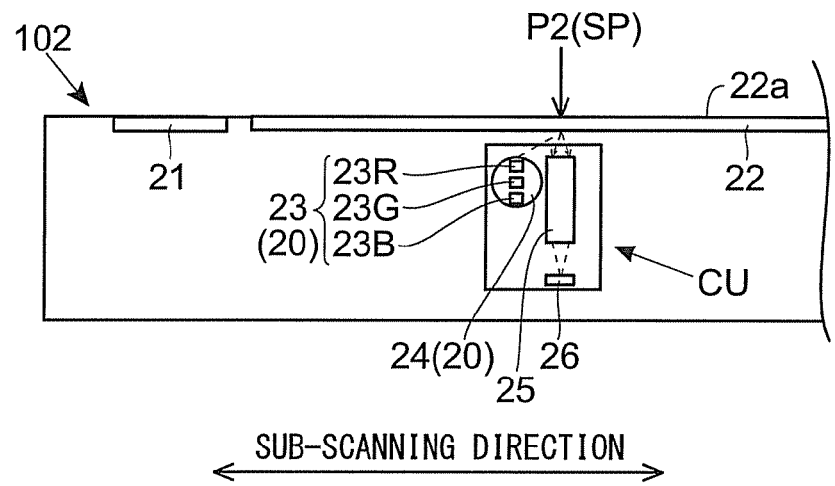
FIG. 8 is a diagram for explaining a position of the CIS unit (light emitting portion) in the sub-scanning direction when the position of the reference point within the document placing surface is indicated by the linear light in the image reading device illustrated in FIG. 2.

Specifically, as illustrated in FIG. 7 and FIG. 8, when the user presses the ID copy key 84, the CIS unit CU moves in the sub-scanning direction so that a region of the place reading contact glass 22 irradiated with the linear light emitted from the light emitting portion 20 (light guide 24) coincides with the position of the reference point SP (predetermined point P2) for the ID copy mode. In other words, the region irradiated with the linear light emitted from the light emitting portion 20 (light guide 24) coincides with a region corresponding to the imaginary line L2. Further, after moving in the sub-scanning direction so that the region of the place reading contact glass 22 irradiated with the linear light emitted from the light emitting portion 20 (light guide 24) coincides with the position of the reference point SP (predetermined point P2) for the ID copy mode, the LED lamp 23 emits light. In this way, the light emitting portion 20 (light guide 24) emits the linear light toward the place reading contact glass 22.

The linear light emitted from the light emitting portion 20 (light guide 24) irradiates the region extending in the main scanning direction and including the position corresponding to the position of the reference point SP (predetermined point P2) for the ID copy mode of the place reading contact glass 22. In other words, the linear light emitted from the light emitting portion 20 (light guide 24) irradiates the region corresponding to the imaginary line L2. In this way, the linear light appearing in the document placing surface 22a (linear light after passing through the place reading contact glass 22) indicates the position in the sub-scanning direction of the reference point SP (predetermined point P2) for the ID copy mode. In FIG. 7, the linear light appearing in the document placing surface 22a is illustrated by hatching.

Here, in the example illustrated in FIG. 7, the position in the sub-scanning direction of the reference point SP (predetermined point P2) for the ID copy mode is indicated by the linear light emitted from the light emitting portion 20 (light guide 24), but a position in the main scanning direction must be checked by the mark 91a.

Figure 9:
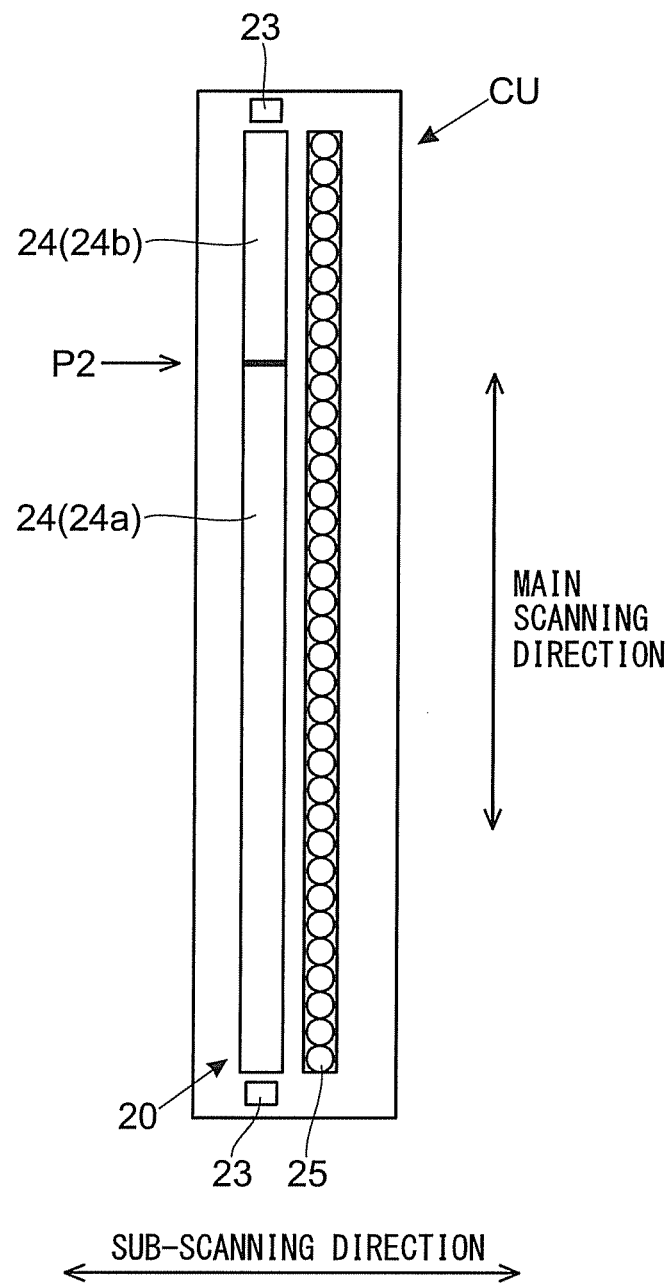
FIG. 9 is a diagram illustrating a case where a light guide of the CIS unit (light emitting portion) illustrated in FIG. 3 is divided at a position corresponding to a position of the reference point in the main scanning direction.

Therefore, as illustrated in FIG. 9, it is possible to divide the light guide 24 at a position corresponding to the position in the main scanning direction of the reference point SP (predetermined point P2) for the ID copy mode. In this structure, the light guide 24 includes a first portion 24a extending from one end in the main scanning direction to a position corresponding to the position in the main scanning direction of the reference point SP (predetermined point P2) for the ID copy mode, and a second portion 24b extending from the other end in the main scanning direction to the position corresponding to the position in the main scanning direction of the reference point SP (predetermined point P2) for the ID copy mode. Note that when the CIS unit CU moves in the sub-scanning direction so that the region of the place reading contact glass 22 irradiated with the linear light emitted from the light emitting portion 20 (light guide 24) coincides with the position of the reference point SP (predetermined point P2) for the ID copy mode, the first portion 24a is a portion coinciding with a side in the main scanning direction of the ID card 10 placed on the document placing surface 22a to be aligned to the position of the reference point SP (predetermined point P2) for the ID copy mode.

Further, when the CIS unit CU moves in the sub-scanning direction so that the region of the place reading contact glass 22 irradiated with the linear light emitted from the light emitting portion 20 (light guide 24) coincides with the position of the reference point SP (predetermined point P2) for the ID copy mode, the LED lamp 23 disposed on one end side in the main scanning direction of the light emitting portion 20 (light guide 24) emits light. In contrast, the LED lamp 23 disposed on the other end side in the main scanning direction of the light emitting portion 20 (light guide 24) does not emit light. In other words, the first portion 24a of the light guide 24 emits the linear light while the second portion 24b of the light guide 24 does not emit the linear light.

Figure 10:
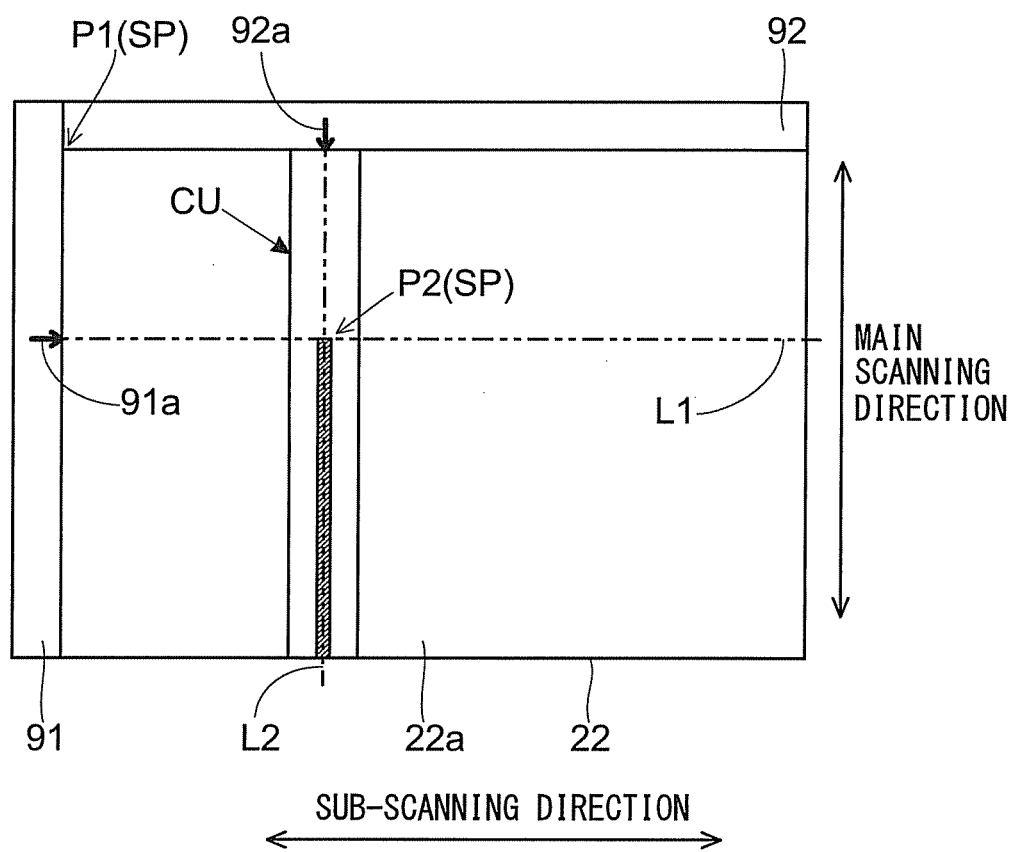
FIG. 10 is a diagram for explaining the region irradiated with the linear light when indicating the position of the reference point within the document placing surface by using the CIS unit (light emitting portion) illustrated in FIG. 9.

In this way, as illustrated in FIG. 10, the linear light appearing in the document placing surface 22a indicates the position in the sub-scanning direction of the reference point SP (predetermined point P2) for the ID copy mode. In addition to this, a discontinuous position of the linear light appearing in the document placing surface 22a substantially coincides with the position in the main scanning direction of the reference point SP (predetermined point P2) for the ID copy mode. Therefore, the position in the main scanning direction of the reference point SP (predetermined point P2) for the ID copy mode is also indicated by the linear light appearing in the document placing surface 22a. In FIG. 10, the linear light appearing in the document placing surface 22a is illustrated by hatching.

In addition, in a case where it is possible to emit only the linear light from the first portion 24a of the light guide 24 (where it is possible to permit only the LED lamp 23 on one end side in the main scanning direction of the light emitting portion 20 to emit light), it is possible when reading the ID card 10 to emit the linear light only from the first portion 24a of the light guide 24 to read the ID card 10.

Figure 11:
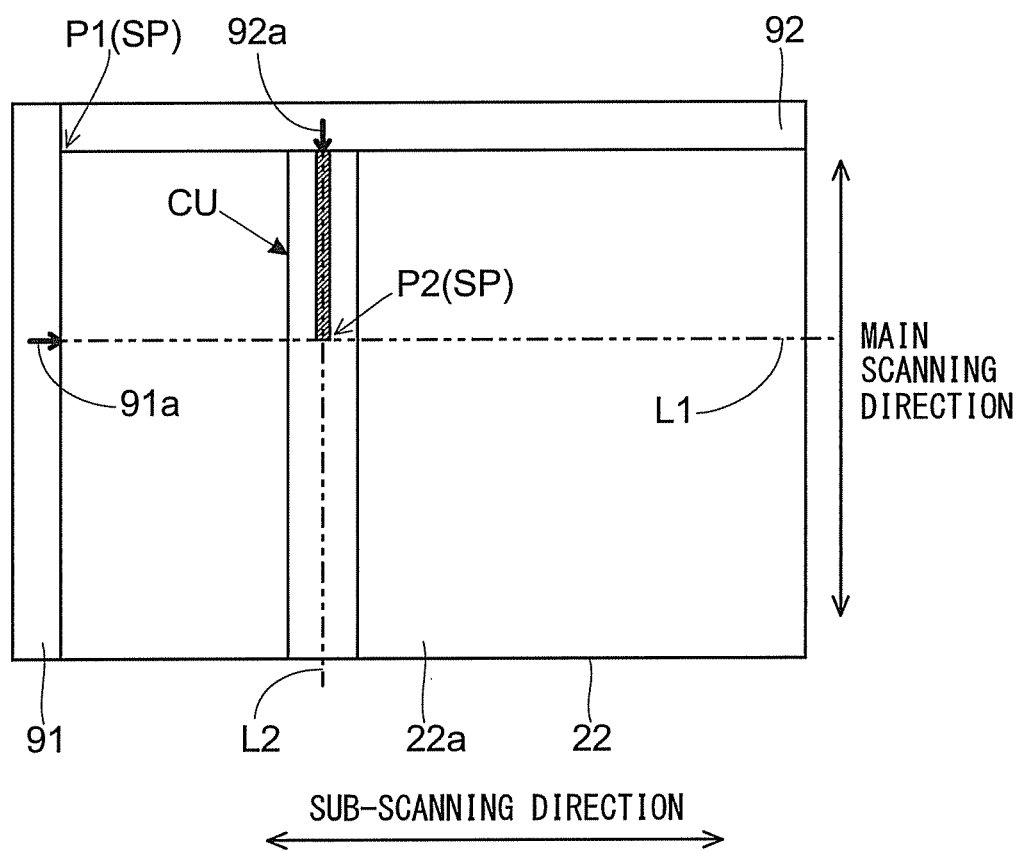
FIG. 11 is a diagram for explaining the region irradiated with the linear light when indicating the position of the reference point within the document placing surface by using the CIS unit (light emitting portion) illustrated in FIG. 9.

Note that when the CIS unit CU moves in the sub-scanning direction so that the region of the place reading contact glass 22 irradiated with the linear light emitted from the light emitting portion 20 (light guide 24) coincides with the position of the reference point SP (predetermined point P2) for the ID copy mode, it is possible to enable the LED lamp 23 disposed on the other end side in the main scanning direction of the light emitting portion 20 (light guide 24) to emit light, and to disable the LED lamp 23 disposed on one end side in the main scanning direction of the light emitting portion 20 (light guide 24) to emit light. In other words, it is possible to prevent the first portion 24a of the light guide 24 from emitting the linear light and to permit the second portion 24b of the light guide 24 to emit the linear light. In this case too, as illustrated in FIG. 11, the discontinuous position of the linear light appearing in the document placing surface 22a substantially coincides with the position in the main scanning direction of the reference point SP (predetermined point P2) for the ID copy mode.

Figure 12:
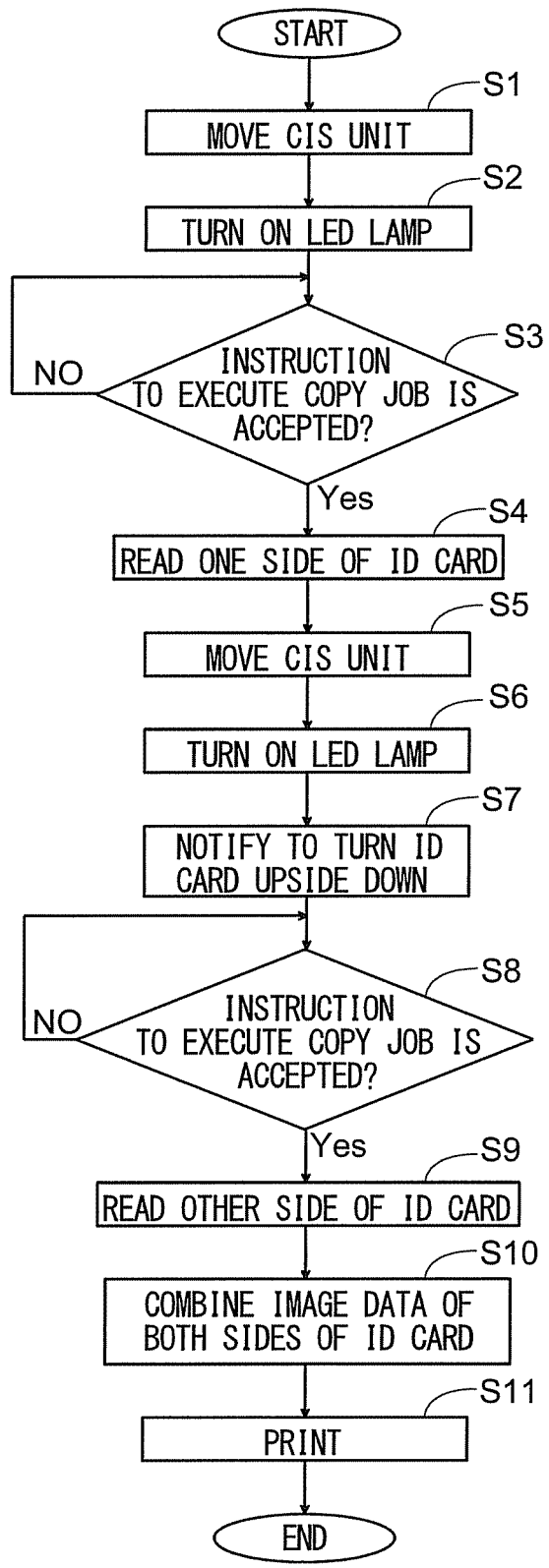
FIG. 12 is a flowchart for explaining a flow when reading a document by setting a predetermined point apart from the index part within the document placing surface as the reference point in the image reading device illustrated in FIG. 2.

Hereinafter, with reference to a flowchart illustrated in FIG. 12, a flow when the copy job is executed in the ID copy mode is described. The flowchart of FIG. 12 starts when the operation panel 108 accepts the mode change instruction to the ID copy mode (when the ID copy key 84 is pressed).

In Step S1, the main body controller 110 instructs the image reading controller 210 to move the CIS unit CU in the sub-scanning direction so that the region of the place reading contact glass 22 irradiated with the linear light emitted from the light emitting portion 20 (light guide 24) coincides with the position of the reference point SP (predetermined point P2) for the ID copy mode.

In Step S2, the main body controller 110 instructs the image reading controller 210 to turn on the LED lamp 23. In this way, as illustrated in FIG. 7, the linear light appearing in the document placing surface 22a (the linear light after passing through the place reading contact glass 22) indicates the position in the sub-scanning direction of the reference point SP (predetermined point P2) for the ID copy mode. In this case, it is possible to notify the user to place the ID card 10 at the position indicated by the linear light appearing in the document placing surface 22a. In this structure, for example, a message to notify to place the ID card 10 at the position indicated by the linear light appearing in the document placing surface 22a is displayed on the operation panel 108 (liquid crystal display portion 81).

Note that when the light guide 24 is divided into the first portion 24a and the second portion 24b, one of the LED lamps 23 disposed on both ends of the light guide 24 is turned on, while the other LED lamp 23 is not turned on (the same is true in Step S6 described later). In this way, as illustrated in FIG. 10 and FIG. 11, the linear light appearing in the document placing surface 22a indicates the position in the sub-scanning direction of the position of the reference point SP (predetermined point P2) for the ID copy mode. In addition, the position in the main scanning direction of the reference point SP (predetermined point P2) for the ID copy mode is also indicated by the linear light appearing in the document placing surface 22a.

In Step S3, the main body controller 110 determines whether or not the operation panel 108 has received the instruction to execute the copy job (whether or not the start key 83 is pressed). When the instruction to execute the copy job is accepted, the process proceeds to Step S4. When the instruction to execute the copy job is not accepted, the determination in Step S3 is repeated.

After the process proceeds to Step S4, the main body controller 110 instructs the image reading controller 210 to read one side of the ID card 10 (the side currently facing the document placing surface 22a). In this case, after performing shading correction or the like, the image reading controller 210 reads one side of the ID card 10 and accumulates image data of one side of the ID card 10 in the image memory 214.

In Step S5, the main body controller 110 instructs the image reading controller 210 to move the CIS unit CU in the sub-scanning direction so that the region of the place reading contact glass 22 irradiated with the linear light emitted from the light emitting portion 20 (light guide 24) coincides with the position of the reference point SP (predetermined point P2) for the ID copy mode. Further, in Step S6, the main body controller 110 instructs the image reading controller 210 to turn on the LED lamp 23.

In Step S7, the main body controller 110 controls the operation panel 108 to notify to turn the ID card 10 upside down. The operation panel 108 displays, for example, a message urging to turn the ID card 10 upside down on the liquid crystal display portion 81.

In Step S8, the main body controller 110 determines whether or not the operation panel 108 has accepted the instruction to execute the copy job. When the instruction to execute the copy job is accepted, the process proceeds to Step S9. When the instruction to execute the copy job is not accepted, the determination in Step S8 is repeated.

After the process proceeds to Step S9, the main body controller 110 instructs the image reading controller 210 to read the other side of the ID card 10 (the side currently facing the document placing surface 22a). In this case, after performing shading correction or the like, the image reading controller 210 reads the other side of the ID card 10 and accumulates image data of the other side of the ID card 10 in the image memory 214.

In Step S10, the main body controller 110 instructs the image processing portion 113 to combine image data of the both sides of the ID card 10. Further, the main body controller 110 instructs an engine portion (the paper sheet feeder 103, the paper sheet transport portion 104, the image forming portion 105, the intermediate transfer portion 106, and the fixing portion 107) to perform printing based on the image data (after combining) of the both sides of the ID card 10.

The image reading device 200 (image forming apparatus 100) of this embodiment includes the place reading contact glass 22 (contact glass) having the document placing surface 22a on which the document D (including the ID card 10) is placed, the document scales 91 and 92 (index part) disposed along sides extending in the main scanning direction and in the sub-scanning direction of the document placing surface 22a, so as to be the index for aligning a corner of the document D to the predetermined reference point SP to which the corner of the document D should be aligned within the document placing surface 22a, the image sensor 26 (reading portion) disposed on the opposite side to the document placing surface 22a so as to read the surface of the document D placed on the document placing surface 22a to face the document placing surface 22a, and the light emitting portion 20 (the LED lamp 23 and the light guide 24) held on the opposite side to the document placing surface 22a in a movable manner in the sub-scanning direction so as to emit the linear light extending in the main scanning direction toward the place reading contact glass 22. Further, when the predetermined point P2 apart from the document scales 91 and 92 within the document placing surface 22a is set as the reference point SP (when the copy job is executed in the ID copy mode), prior to reading the document D, the light emitting portion 20 moves in the sub-scanning direction so that the region of the place reading contact glass 22 irradiated with the linear light emitted from the light emitting portion 20 coincides with the reference point SP (predetermined point P2), and emits the linear light toward the place reading contact glass 22.

With the structure of this embodiment, when the predetermined point P2 apart from the document scales 91 and 92 within the document placing surface 22 is set as the reference point SP, prior to reading the document D, the region extending in the main scanning direction including the position corresponding to the reference point SP (predetermined point P2) of the place reading contact glass 22 is irradiated with the linear light. Therefore, the linear light appearing in the document placing surface 22a (linear light after passing through the place reading contact glass 22) indicates the position in the sub-scanning direction of the reference point SP (predetermined point P2) apart from the document scales 91 and 92 within document placing surface 22a. As a result, it is possible to easily align the document D to the reference point SP (predetermined point P2) apart from the document scales 91 and 92 within the document placing surface 22a.

In addition, in this embodiment, as described above, when reading the document D (including the ID card 10) placed on the document placing surface 22a, the light emitting portion 20 emits the linear light toward the place reading contact glass 22 having the document placing surface 22a on which the document D is placed. Further, the image sensor 26 receives light reflected by the document D so as to read the document D. In other words, the linear light emitted from the light emitting portion 20 is also used for reading the document D. With this structure, it is not necessary to additionally dispose a dedicated light emitting portion for emitting the linear light indicating the reference point SP (predetermined point P2). Therefore, the number of components is not increased, and the structure is not more complicated.

In addition, in this embodiment, as described above, the light emitting portion 20 includes the LED lamp 23 (light source) and the light guide 24 that is formed to extend in the main scanning direction and converts light from the LED lamp 23 into the linear light so as to emit the linear light toward the place reading contact glass 22. Further, the light guide 24 converts the light from the LED lamp 23 into the linear light and emits the linear light toward the place reading contact glass 22. With this structure, the light emitted from the light emitting portion 20 toward the place reading contact glass 22 is prevented from expanding in the sub-scanning direction so that the appropriate linear light can be emitted from the light emitting portion 20 toward the place reading contact glass 22. In this way, the position in the sub-scanning direction of the reference point SP (predetermined point P2) can be exactly indicated by the linear light appearing in the document placing surface 22a.

Here, in the variation (the example illustrated in FIGS. 9 and 10) of this embodiment, as described above, the LED lamp 23 is disposed to each of the one end side and the other end side in the main scanning direction of the light guide 24, and the light guide 24 is divided at a position corresponding to the position of the reference point SP (predetermined point P2) in the main scanning direction. Further, when the light emitting portion 20 moves in the sub-scanning direction so that the region of the place reading contact glass 22 irradiated with the linear light emitted from the light emitting portion 20 coincides with the reference point SP (predetermined point P2), the LED lamp 23 disposed on one end side in the main scanning direction of the light guide 24 emits light, while the LED lamp 23 disposed on the other end side in the main scanning direction of the light guide 24 does not emit light. In other words, the first portion 24a of the light guide 24 emits the linear light, but the second portion 24b of the light guide 24 does not emit the linear light. With this structure, the discontinuous position of the linear light appearing in the document placing surface 22a substantially coincides with the position in the main scanning direction of the reference point SP (predetermined point P2). In this way, the position in the main scanning direction of the reference point SP (predetermined point P2) can also be indicated by the linear light appearing in the document placing surface 22a.

The embodiment disclosed here is an example in all aspects and should not be interpreted to be a limitation. The scope of the present disclosure is defined not by the above description of the embodiment but by the claims, and further includes all modifications within the meanings and scope equivalent to the claims.

Figure 13:
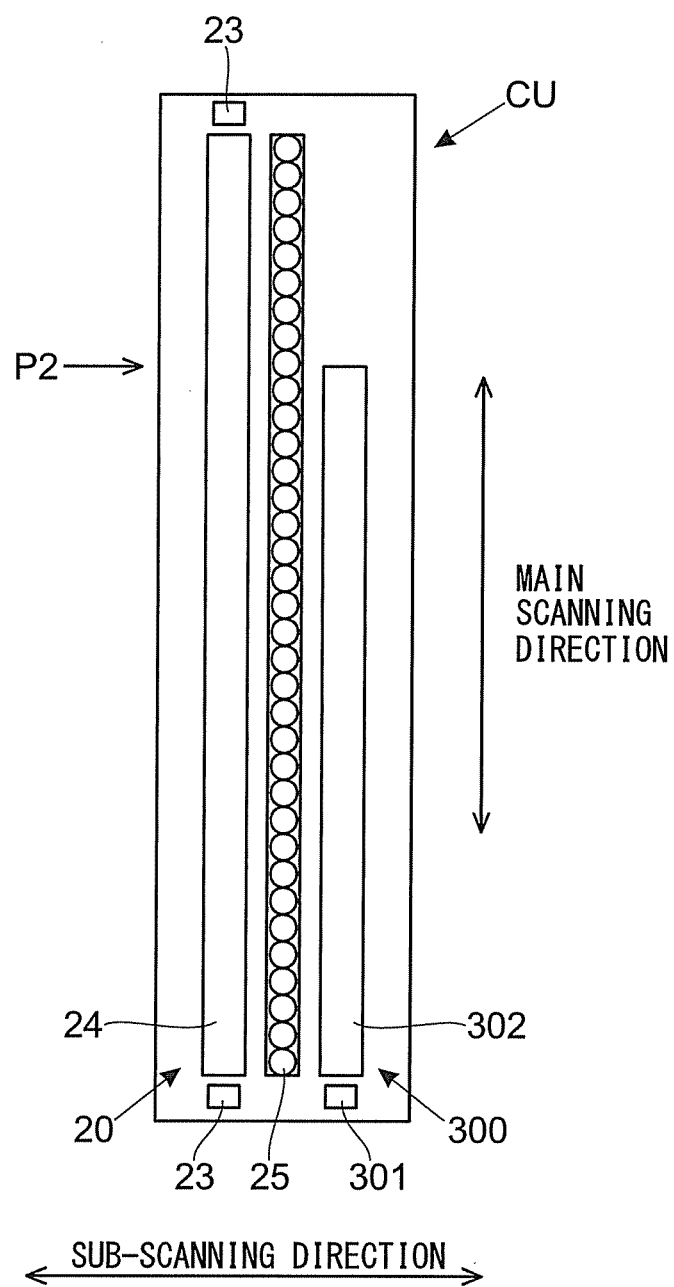
FIG. 13 is a diagram in a case where a dedicated light emitting portion for indicating the position of the reference point within the document placing surface is additionally disposed in the CIS unit illustrated in FIG. 3.

For instance, as illustrated in FIG. 13, a light emitting portion 300 other than the light emitting portion 20 may be disposed in the CIS unit CU. The light emitting portion 300 includes an LED lamp 301 and a light guide 302. The LED lamp 301 is disposed on one end side in the main scanning direction of the light guide 302 so that light entering the light guide 302 is emitted from the light guide 302. The light guide 302 is cut off at the position corresponding to the position in the main scanning direction of the reference point SP (predetermined point P2) for the ID copy mode. In this structure, the light emitting portion 20 corresponds to a "document irradiating light emitting portion" of the present disclosure.

Further, when the predetermined point P2 apart from the document scales 91 and 92 within the document placing surface 22a is set as the reference point SP (when the copy job is executed in the ID copy mode), prior to reading of the ID card 10, the CIS unit CU moves in the sub-scanning direction so that the region of the place reading contact glass 22 irradiated with the linear light emitted from the light emitting portion 300 (light guide 302) coincides with the reference point (predetermined point P2) for the ID copy mode. In this case, the LED lamp 301 emits light, but the LED lamp 23 does not emit light. In other words, the light emitting portion 300 (light guide 302) emits the linear light, but the light emitting portion 20 (light guide 24) does not emit the linear light. In this way, the linear light appearing in the document placing surface 22a indicates the position in the sub-scanning direction of the reference point SP (predetermined point P2) for the ID copy mode. Further, the discontinuous position of the linear light appearing in the document placing surface 22a substantially coincides with the position in the main scanning direction of the reference point SP (predetermined point P2) for the ID copy mode. Therefore, the position in the main scanning direction of the reference point SP (predetermined point P2) for the ID copy mode is also indicated by the linear light appearing in the document placing surface 22a (similarly to the example illustrated in FIG. 10).

Note that when the document D (including the ID card 10) is read, the linear light emitted from the light emitting portion 20 (light guide 24) is used, and the light emitting portion 300 (light guide 301) does not emit the linear light.

What is claimed is:

1. An image reading device comprising:
a contact glass having a document placing surface on which a document is placed;
an index part disposed along sides extending in a main scanning direction and in a sub-scanning direction of the contact glass, so as to be a mark for aligning a corner of the document to a reference point set at a predetermined position inside the document placing surface, the position not lying on an edge of the document placing surface;
a reading portion disposed on an opposite side to the document placing surface so as to read a surface of the document placed on the document placing surface; and
a light emitting portion held on the opposite side to the document placing surface in a movable manner in the sub-scanning direction so as to emit linear light extending in the main scanning direction toward the contact glass, wherein
before the reading portion reads the document, the light emitting portion moves in the sub-scanning direction so that a region of the contact glass irradiated with the linear light emitted from the light emitting portion coincides with the reference point, and emits the linear light toward the contact glass.

2. The image reading device according to claim 1, wherein when reading the document placed on the document placing surface, the light emitting portion emits the linear light toward the contact glass having the document placing surface on which the document is placed, and the reading portion reads the document by receiving light reflected by the document.

3. The image reading device according to claim 1, wherein the light emitting portion includes a light source and a light guide formed to extend in the main scanning direction so as to convert light from the light source into the linear light and to emit the linear light toward the contact glass.

4. The image reading device according to claim 3, wherein the light source is disposed on each of one end side and the other end side in the main scanning direction of the light guide,
the light guide is divided at a position corresponding to a position of the reference point in the main scanning direction, and
before the reading portion reads the document, when the light emitting portion moves in the sub-scanning direction so that the region of the contact glass irradiated with the linear light emitted from the light emitting portion coincides with the reference point, one of the light sources disposed on one end side and the other end side in the main scanning direction of the light guide emits light while the other light source does not emit light.

5. The image reading device according to claim 1, wherein the light guide has a structure including a first portion and a second portion separated at a position corresponding to a position of the reference point in the main scanning direction,
the first portion is a portion to coincide with a side along the main scanning direction of the document placed on the document placing surface in accordance with the reference point when the light emitting portion moves in the sub-scanning direction so that the region of the contact glass irradiated with the linear light emitted from the light emitting portion coincides with the reference point, and
one of the light sources disposed on the one end side and the other end side in the main scanning direction of the light guide emits light so that the light is guided into the first portion.

6. The image reading device according to claim 1, wherein the light emitting portion includes a light source and a light guide formed to extend in the main scanning direction so as to convert light from the light source into the linear light and to emit the linear light toward the contact glass, and
the light guide is cut at a position corresponding to a position of the reference point in the main scanning direction.

7. The image reading device according to claim 6, further includes a document irradiating light emitting portion for irradiating the document with light when reading the document, in addition to the light emitting portion.

8. An image forming apparatus comprising the image reading device according to claim 1.

* * * * *